Figure 1:
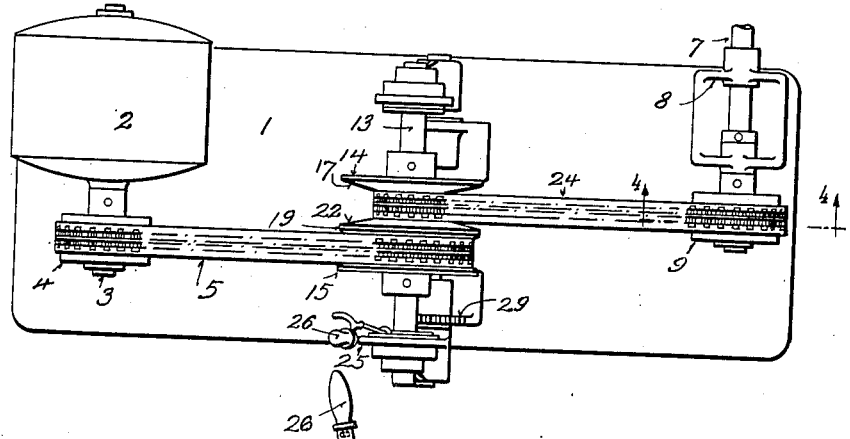

May 4, 1937.　　　　O. I. JUDELSHON　　　　2,079,351
DRIVE BELT
Filed Nov. 19, 1935　　　　2 Sheets-Sheet 1

INVENTOR
Oscar I. Judelshon
BY
Charles G. Hensley
ATTORNEY

May 4, 1937.　　　O. I. JUDELSHON　　　2,079,351
DRIVE BELT
Filed Nov. 19, 1935　　　2 Sheets-Sheet 2
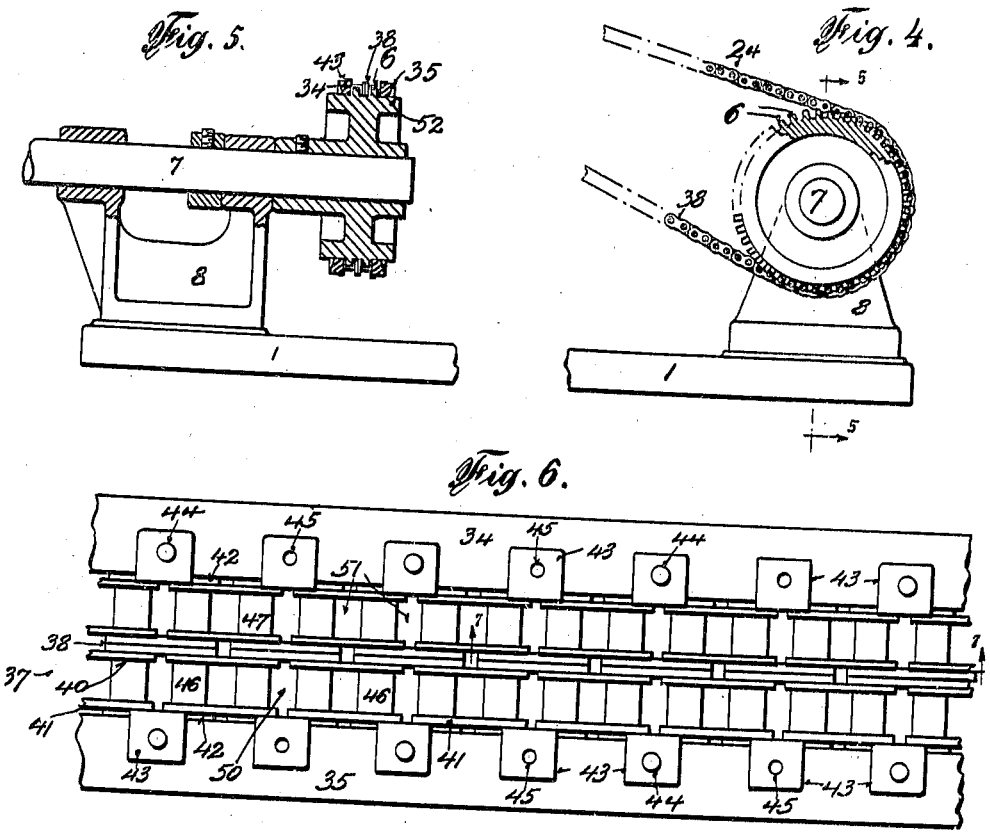
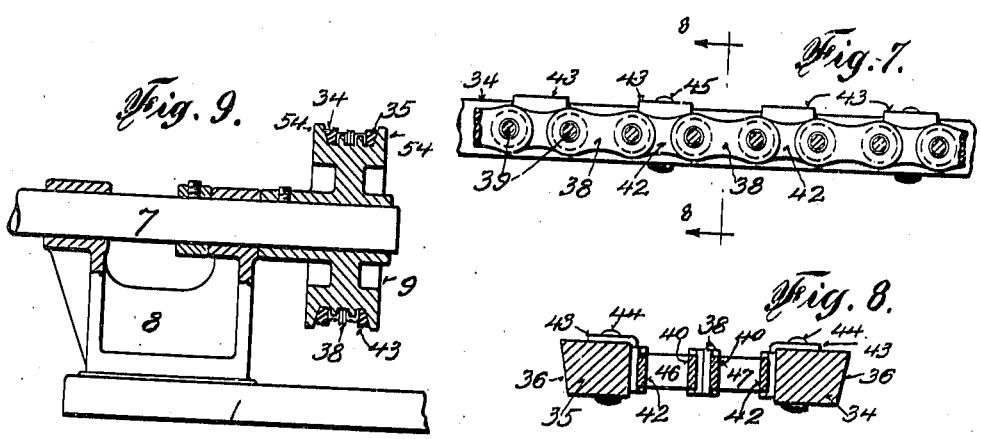
INVENTOR
Oscar I. Judelshon
BY
Charles G. Hensley
ATTORNEY Patented May 4, 1937

2,079,351

UNITED STATES PATENT OFFICE 2,079,351

DRIVE BELT

Oscar I. Judelshon, Park Ridge, N. J.

Application November 19, 1935, Serial No. 50,495

3 Claims. (Cl. 74—236)

My present invention relates to drive belts and while it is not necessarily limited to any particular use, it is especially advantageous when used as a drive belt in connection with variable speed drive devices, and I have chosen to illustrate my invention as applied for that purpose.

In connection with variable speed drives which include expansible pulleys, it has been difficult to provide a satisfactory belt, especially where the drive is designed to transmit say, more than 2 H. P. In drives of this character it is common to employ what is known as a V type belt, that is, a belt having its side edges divergent or V shaped, to engage between the flanges of the pulley having slanting surfaces, the flanges of the pulley being relatively movable, so that the arc of curvature around the pulley of the belt may be increased or decreased to vary the speed ratio as between the driving and driven member.

Where the power to be transmitted is relatively low, say 2 H. P. or less, it is convenient to use a V type belt made solely of rubber or rubber composition having fabric imbedded therein. However, when greater horsepower is to be transmitted through the drive, it is necessary to use a stronger belt and a wider belt, and when this becomes necessary other disadvantages are met with.

For instance, if the belt is made only of rubber and fabric and it is made relatively wide it has a tendency to bend downwardly in the middle, thereby distorting the belt and throwing the side portions which have the slanting surfaces out of their correct position so that only a small portion of the edge of the belt actually contacts with the frusto conical surfaces of the flanges of the expansible pulley. If the thickness of the belt is increased to gain added strength, it becomes difficult to bend the belt around the expansible pulleys of small diameter and the only previous way of offsetting this was to make the expansible pulleys and the driving and driven pulleys undesirably large in diameter.

The object of my invention is to overcome all of these disadvantages by providing a transmitting belt which is the combination of a belt and a chain, so designed and constructed that the chain portion provides ample strength for transmitting any desired horsepower, and the rubber or belt portions disposed along the sides of the chain may have V shaped edges engaging the frusto conical surfaces of the expansible pulleys in order that the combined device may serve in the same capacity as an all rubber and fabric belt, but without its disadvantages. With this combination and construction it is possible to provide a belt of reasonable and practical proportions but having much greater strength than a belt consisting only of rubber and fabric. Furthermore, this combination belt, even where designed for relatively large horsepower transmission, will readily bend in small arcs so that the expansible pulleys may be made relatively small even where higher horsepower is transmitted.

With this combination belt it is not necessary to make the belt so thick as to be cumbersome and unwieldy.

Furthermore, the driving and driven pulleys of the variable drive need not be made excessively large where the present belt is employed, that is to say, the driving and driven members, instead of being made as pulleys, may consist partly or entirely of sprocket wheels in order that there will be no slippage as between the belts and the driving and driven members, even though the latter are of relatively small diameter.

In the drawings I have shown an alternative construction of the driving and driven members in one case, these members being shown as sprockets to engage only the chain portion of the belt, whereas in the other form the driving and driven members consist not only of sprockets but also pulley flanges having frusto conical faces engaging the V edges of the belt.

The chain is so incorporated and combined with the belt strips on opposite sides of it that the device as a whole flexes very readily but will, nevertheless, be capable of transmitting considerable power relatively to the size of the belt.

The present belt is noiseless in operation. Other features and advantages of my invention will be set forth in the following detailed description thereof.

Figure 2:
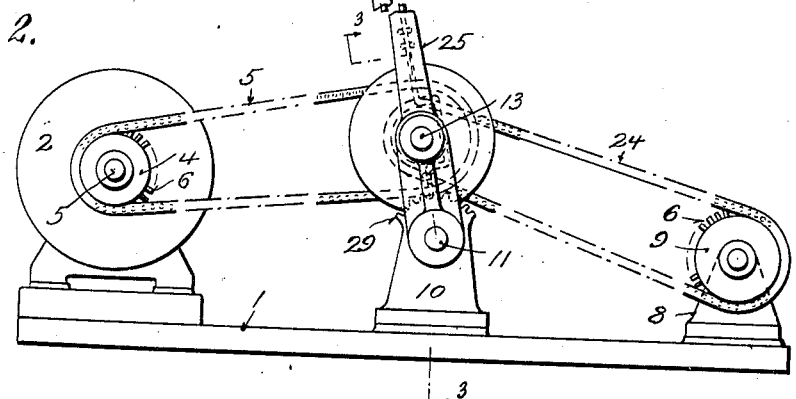
Figure 3:
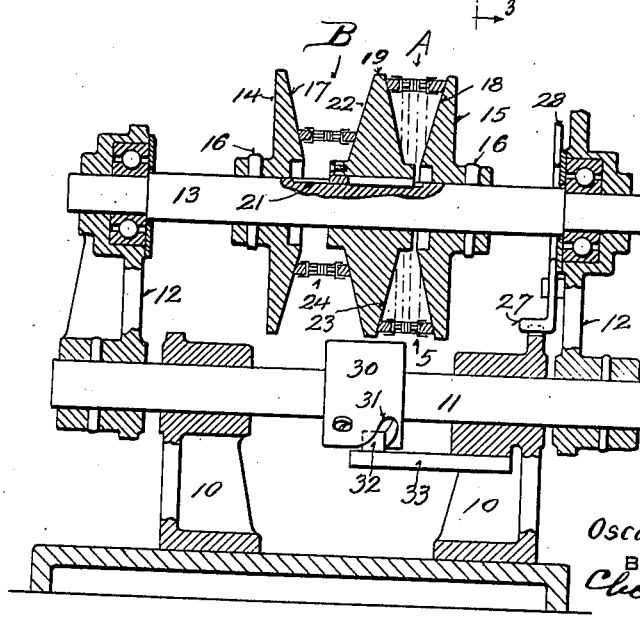

In the drawings forming part of this application,

Figure 1 is a plan view of a variable drive device to which my invention has been applied, Figure 2 is a front elevation thereof, Figure 3 is a sectional view taken on the line 3—3 of Figure 2, Figure 4 is a sectional view taken on the line 4—4 of Figure 1, Figure 5 is a sectional view taken on the line 5—5 of Figure 4, Figure 6 is a plan view of a portion of a drive belt embodying my invention, Figure 7 is a sectional view taken on the line 7—7 of Figure 6, Figure 8 is a sectional view taken on the line 8—8 of Figure 7, and Figure 9 is a view similar to Figure 5 but showing a modified form of pulley.

I will first describe the form of the invention illustrated in Figures 1 to 8 inclusive. I have shown a drive device corresponding with that shown and described in my co-pending application Serial No. 28,796, filed June 28, 1935, as one type of variable speed drive where by present belt is applicable, but it will be understood that the belt itself may be used in any other type of drive. I have shown the drive device mounted on a base 1 with the motor 2 at one end of the base; and the shaft 3 of this motor is provided with the driving sprocket 4 around which one of the drive belts 5 travels. I have shown this sprocket as having a double row of teeth 6 extending around the same in spaced parallel relation to engage between the double row of links in the chain of the belt, as will be more fully described.

At the opposite end of the base I have shown a driven shaft 7 mounted in a suitable bracket 8 and power is taken from this shaft to drive any type of machine or apparatus. The driven shaft is provided with a sprocket 9 similar in all respects to the sprocket 4.

Intermediate the driving and driven members I have shown two brackets 10 mounted on the base 1 and in the upper end of these brackets there is journaled a rocker shaft 11 extending crosswise of the device. There are mounted on this shaft spaced, parallel arms 12 which extend upwardly and are provided with bosses in which is journaled a shaft 13 which is parallel with the shaft 11.

On the shaft 13 there are mounted two expansible pulleys A and B consisting of the spaced flange members 14, 15 both of which are pinned to the shaft 13 by the pins 16; and these flanges have frusto conical faces 17, 18 facing each other.

The intermediate flange member 19 is common to both pulleys and is mounted to revolve with the shaft 13 and to slide axially thereon by means of the key 20 attached to the flange member and travelling in the keyway 21 in the shaft. This intermediate flange member is provided with a frusto conical surface 22 facing the frusto conical surface 17 of one end flange member and with the frusto conical surface 23 on its opposite side facing the frusto conical surface 18 of the flange member 15. The endless belt 5 travels around the driving member 4 and around the pulley A whereas another and similar endless belt 24 travels around the driven member 9 and around the expansible pulley B.

Extending upwardly from one of the arms 12 there is a lever arm 25 having a handle 26 at its upper end by means of which the lever arms 12, the shaft 13 and the expansible pulleys carried thereby may be swung laterally or toward and from the driving and driven members. There is a pawl 27 on the lower end of the rod 28 the latter extending upwardly and being attached slidably to the lever arm 25, and this pawl is adapted to lock in different positions in the teeth 29 of a toothed sector formed on the upper end of one of the supporting brackets 10. The rod 28 is adapted to be operated by the hand which grasps the handle 26 preferably through the means shown in my said co-pending application, for the purpose of locking the shaft 11.

I have shown a cam 30 fixed to the oscillating shaft 11 and having a cam groove 31 in which engages a pin 32 carried by a bracket 33 secured to one of the supporting brackets 10.

When the rocking shaft 11 is rocked, this cam and the pin engaging with it forces the shaft 11 to move axially for the purpose of moving the shaft 13 and the expansible pulleys carried with it in an axial direction for a purpose which is fully set forth in my said co-pending application.

My present invention relates to the transmission belts 5 and 24 which are employed for transmitting power to the expansible pulley A from the driven member 4 and for transmitting power from the expansible pulley B to the driven pulley 9 and I will here describe the construction and operation of this belt. As shown in the drawings, and particularly in Figure 6, the belt which may be of any length and width, includes two side members 34, 35 made of pliable material such as rubber or rubber composition, and these members may have fabric embodied in the rubber for added strength if desired. These side members have their outer edges inclined or slanted, as shown at 36 in Figure 8 to constitute what is known as a V type belt, and these surfaces are inclined so as to be parallel with the frusto conical surfaces of the several members of the expansible pulleys. These constitute the friction members which are in direct contact with the V type pulleys, either the expansible type or fixed type. Intermediate the two side members 34, 35 I provide a chain 37 which is securely attached at short intervals at each side with the two side members.

The chain is not per se new, and it will be understood that other types of chains may be used in the combination. The chain shown herein consists of a middle row of links as follows: There are two juxtaposed links 38 through which two adjacent cross pins 39 of the chain pass. There are also outside links 40 arranged parallel to each other and through each of which extend two of the pivotal pins 39 of the chain. The links 40 straddle or are on opposite sides of the links 38 and partly overlap the same.

These several sets of links form the articulate central and longitudinal structure of the chain, uniting the several cross pins in articulate relation with each other. At each side of the chain there are links 41 each having two of the cross pins 39 of the chain passing therethrough, or in other words, the links 41 connect in pairs two of the cross pins 39 of the chain.

In addition, there are other links 42 each of which has two of the cross pins extending therethrough at opposite ends of the links, and these links overlap adjacent ends of two of the links 41. Therefore, the link construction at each side of the chain corresponds with the middle links of the chain and connect the several cross pins of the chain in articulate relation. The links 41 correspond in their function and position with the links 40 whereas the links 42 correspond in position and function with the links 38.

Each of the links 42 is provided with an overlapping plate 43 these plates extending laterally in one direction at one side of the chain and laterally in the opposite direction at the opposite side of the chain. The upper row of plates 43 in Figure 6 all lie against the top surface of the side member 34 and the plates 43 in the lower row all lie against the top surface of the side member 35. The plates 43 are secured to the side members by rivets 44 which pass through the plates and through the side members, firmly securing them together.

I prefer to arrange the plates 43 at rather short intervals along the chain, but in some cases it may be undesirable to connect all of these plates by rivets with the side members because the material of the side members tends to buckle where the rivets are placed too close together.

I have therefore shown rivets passing through only alternate plates 43 along the length of the belt, omitting rivets from the holes 45 in each alternate plate, although the plate itself is present to cause the side members to bend with the chain. Preferably, there are rollers 46 between the links 40, 41 on the several cross pins of the chain to act as antifriction members in cases where the belt is to be used in conjunction with one or more sprockets as well as the V type pulley.

As shown in Figures 1 and 3, the belt operates on the V type pulleys in the same manner as an ordinary V type belt which is made solely of rubber or rubber and fabric. The slanting surfaces 36 of the side members 34, 35 engage frictionally with the frusto conical surfaces of the pulleys and the belt travels around these pulleys in the same manner as the belts made solely of rubber or rubber and fabric. There is the same traction action between the belts and the pulleys. However, as a substantial portion of the width of the belt consists of the chain, the belt as a whole, even though made wide and heavy for transmitting considerable power, will not sag in the middle regardless of the load carried by the belt, because of the lateral inflexible character of the chain.

As was pointed out above, where the belt is made solely of pliable material it tends to sag in the middle, thus throwing the V surfaces 36 of the belt out of parallelism with the frusto conical surfaces of the pulleys. In the present construction this cannot happen because of the lateral inflexibility of the chain and because the side members 34, 35 which are composed of rubber or rubber and fabric, are of comparatively narrow width as compared with the total width of the belt. Obviously, a belt of this construction for any given size and weight is much stronger than a belt made only of rubber or rubber and fabric, so that a transmitting belt for any given power may be made and it may be thinner than a wholly rubber belt.

As shown in Figures 1 and 5, the driving member may be a simple sprocket wheel with two rows of teeth 6 extending around its periphery. In this case one row of teeth will engage the chain by entering the spaces 50 between one row of links and the other row of teeth will engage in the spaces 51 between the other row of links. The side members 34, 35 may rest at their bottom edges on the lateral surfaces 52 of the driving member extending laterally beyond the sprocket teeth, as shown in Figure 5. Thus, the side members will have a frictional engagement with the sprocket and if the parts are so designed that the chain is slightly above the bottom surfaces of the side members, as shown in Figure 7, the drive belt is noiseless in its operation around the driving member. The driven member may be exactly like the driving member and the belt 24 will cooperate in the same manner therewith.

If desired, the driving and driven members may be modified as shown in Figure 9. In this construction there is a double row of teeth 53 around the sprocket, which act exactly like the teeth in the previously described form in conjunction with the links of the chain. In this construction, however, the sprocket is constructed to act also as a pulley and for this purpose it may be provided with flanges 54 on opposite sides which have opposed frusto conical surfaces 55 pitched at the same angles as the frusto conical surfaces of the expansible pulleys.

While the chain is travelling around the driving or driven member of this type, the teeth of the sprocket not only cooperate with the chain but the V shaped edges 36 of the side members of the belt also frictionally engage the frusto conical surfaces 55 of the two flanges 54 so that the belt is gripped positively and frictionally by the driving or driven members.

It is obvious that the device shown in Figure 9 may be modified by omitting the double row of sprockets teeth, so that the belt co-operates by friction only where the V-shaped edges 36 frictionally engage the frusto conical surfaces 55 in which case the action will be the same as with the expansible pulleys. However, in cases where it is desirable to keep the driving and driven members of small diameter and to avoid any possibility of slippage, the sprocket teeth are preferably employed.

As the belt travels around any of the pulleys it readily bends to conform with the arc of curvature where the belt loops around the pulleys, so that even a belt made for heavy duty may be caused to travel around a relatively small pulley. The links of the chain articulate practically without resistance whereas the side members 34, 35 constituting only a portion of the whole belt are of narrow width and therefore they flex with less resistance than if the whole belt were made of the same material. The total resistance to the bending of the belt is therefore considerably less than a belt made solely of rubber or rubber and fabric for transmitting corresponding power.

Another advantage is that as the volume of the total flexible material which is continually bent in this type of belt is much less than in the previous type, the heat produced during operation of the belt is considerably less than with the former type.

It will be apparent that the chain may be made of lesser width with only the side links 41, 42, the middle rows of links being omitted. This may be done in cases where the belt is called upon to transmit lesser power. It will be obvious that the chain may be much wider and additional rows of links provided where the belt is to transmit very much greater power. In other words, the chain may consist of several rows of links corresponding with the links 38, 40 as well as the side links, but the operation will be the same as herein described. Furthermore, the parts of the links may be made larger and stronger in which case the thickness of the side members may be increased accordingly.

Where the belt is travelling around the expansible pulleys, the side plates 43 of the chain are pressing against the outer faces of the side members 34 and 35, so that at this time there is comparatively slight stress exerted on the rivets 44. These rivets pass vertically through the plates 43 and the side members 34 and 35.

It is an advantage to use sprocket wheels for the driving and driven members instead of mere driving and driven pulleys, especially where the driving and driven pulleys, especially where the driving and driven pulleys are to be kept to small sizes, because where the belt material is bent around a small arc the belt material is so compressed that the slanting surfaces 36 tend to straighten out or become perpendicular, thereby reducing the area of contact between the belt and the flanges of the pulleys when they are of small diameter. By using sprocket wheels for the driving and driven members this difficulty is avoided.

Having described my invention, what I claim is:

1. A transmitting belt including a chain extending lengthwise of the belt, said chain having cross pins, longitudinally extending links pivotally connected with said cross pins, the outer links on the outer sides of said chain having laterally extending plates, members disposed at opposite sides of said chain and extending lengthwise the full length of the belt, said side members composed of pliable belt material, and rivets passing through said plates and said side members to unite them together.

2. A transmitting belt including a chain extending lengthwise of the belt, said chain having cross pins, links disposed longitudinally of the belt and pivotally connecting said cross pins, the links at the outer sides of said chain having laterally extending plates, continuous side members disposed at opposite sides of the chain and extending lengthwise of the belt, said side members being composed of pliable belt material, said plates engaging the outer surfaces of said side members, rivets connecting certain of said side members to said plates and certain of said plates engaging said side members and being unattached thereto.

3. A transmitting belt including a chain extending lengthwise of the belt, said chain having cross pins, longitudinally extending links pivotally connected with said cross pins, the outer links on the outer sides of said chain having laterally extending plates, members disposed at opposite sides of said chain and extending lengthwise the full length of the belt, said side members being composed of pliable belt material, said laterally extending plates of the chain engaging against the outer surfaces of said side members, and rivets passing vertically through said side plates and said side members to unite them together.

OSCAR I. JUDELSHON.